May 10, 1966  P. N. CHALOUX  3,250,552

HOSE COUPLING WRENCH

Filed Nov. 9, 1964

INVENTOR.
PAUL N. CHALOUX
BY Harry M. Saragovitz,
Edward J. Kelly, Herbert Berl
& Charles F. Murphy
ATTORNEYS United States Patent Office 3,250,552
Patented May 10, 1966

3,250,552
HOSE COUPLING WRENCH
Paul N. Chaloux, Natick, Mass., assignor to the United States of America as represented by the Secretary of the Army
Filed Nov. 9, 1964, Ser. No. 410,036
9 Claims. (Cl. 285—39)

The invention described herein, if patented, may be manufactured and used by or for the Government for governmental purposes without the payment to me of any royalty thereon.

This invention relates to a coupling wrench and more particularly to a hose coupling wrench which is held captive on a hose coupling.

In equipment utilizing liquids conducted from one point to another, as for example, gasoline-fired heaters and stoves used by the Armed Forces, rubber hoses are frequently employed. These hoses require couplings in many cases in order to facilitate making and breaking connections in the hose lines at convenient points. Heretofore it has been customarily to employ threaded male and female type coupling elements having hexagonal nuts integral therewith and to employ auxiliary wrenches to rotate the hexagonal nut on one coupling element while holding the hexagonal nut of the mating element stationary. Quite often these wrenches were lot or misplaced. In some cases they required adjustment which was difficult under some operating conditions such as extreme cold. Since the Armed Forces must operate under extreme environmental conditions, it is highly desirable to make possible quick and easy connection or disconnection of fuel hoses or other types of hoses under unfavorable climatic conditions as well as under ordinary conditions.

It is, therefore, an object of this invention to provide a coupling wrench for hose couplings and the like which will remain connected to a hose coupling element without being permanently formed as a part of such a hose coupling element.

Another object of the invention is to provide a relatively low cost device for connecting or disconnecting hose coupling elements without the use of auxiliary tools and without casting or otherwise producing a hose coupling device in the form of a wing nut or other similar integrally formed extension of the coupling elements, which would be relatively expensive to manufacture.

A further object of the invention is to provide a coupling wrench which is held captive on a hose coupling element but which can be removed from its normal captive position in connection with the hose coupling element when desired.

Yet another object of the invention is to provide a device for use with standard hose couplings or with existing couplings in equipment used by the Armed Forces without requiring the manufacture of special purpose couplings to eliminate the need for auxiliary tools to assist in connecting or disconnecting such couplings.

Various other objects and advantages will appear from the following description of one embodiment of the invention and in the appended claims.

The foregoing objects are accomplished by providing a generally channel-shaped wrench having an aperture in the base thereof whereby the wrench is held captive on the shank portion of a hose coupling element between the end of a hose and the nut portion of the coupling element capable of engaging said nut portion within the parallel upstanding sides of the channel-shaped wrench.

The present invention may be more fully understood by reference to the accompanying drawings in which like numerals are used to designate like parts in the various views and in which.

Figure 1:
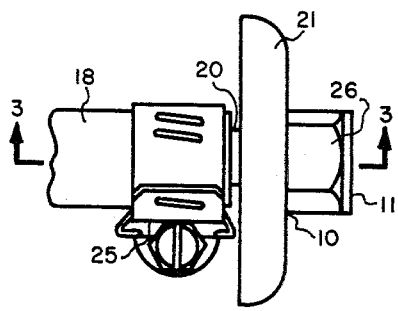
FIGURE 1 is a plan view of the coupling wrench of the invention in combination with a rotatable nut of a female hose coupling element joined to the end of a hose.
Figure 2:
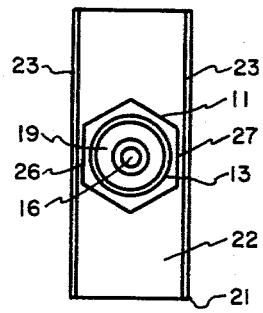
FIGURE 2 is an end view of the female hose coupling element and coupling wrench of FIGURE 1.
Figure 3:
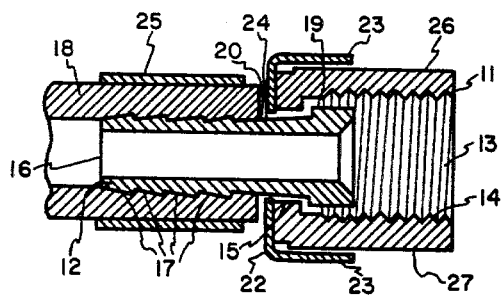
FIGURE 3 is an enlarged horizontal section taken along the line 3—3 of FIGURE 1.
Figure 4:
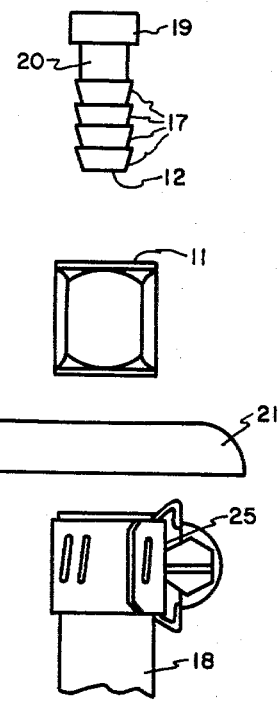
FIGURE 4 is an exploded view of the female hose coupling element, coupling wrench and hose of FIGURE 1.

In FIGURES 1–4 of the drawing rotatable female hose coupling element 10 comprises a nut 11 and a serrated, tubular shank 12 separable from nut 11 but cooperative therewith. Nut 11 is preferably a hexagonal nut having three pairs of opposed substantially parallel, planar, exterior sides. Nut 11 also has a central bore 13 provided with threads 14 with which a threaded male coupling element cooperates to connect the ends of two lengths of hose. Nut 11 also has an internal flange 15 at one end thereof, which flange extends inwardly from the sides of the nut partially across bore 13 for a purpose to be described. Shank 12 is provided with a central bore 16 running the length thereof. Adjacent to one of its ends shank 12 has a series of external serrations 17 for gripping the inside walls of a hose 18 when the female hose coupling element is joined to the hose. Shank 12 has a flange 19 extending outwardly from the central bore at the opposite end thereof from serrations 17. Flange 19 is of greater diameter than the opening within internal flange 15 of nut 11 so that when hose coupling element 10 is assembled, a tight but rotatable joint is formed between internal flange 15 of nut 11 and flange 19 of shank 12. Neck 20 of shank 12 connects flange 19 with serrations 17 and is of slightly less diameter than the opening in internal flange 15 so that shank 12 passes freely through nut 11 and internal flang 15 thereof until flange 19 seats against the inner face of internal flange 15.

Coupling wrench 21 is an elongated channel-shaped body having a flat base 22 and upstanding parallel sides 23 which are flat and substantially perpendicular to base 22. The parallel sides 23 are spaced to receive and closely engage a pair of opposed planar surfaces of nut 11 therebetween. The base 22 has a circular aperture 24 therethrough approximately midway between both ends thereof and midway between sides 23 of sufficient diameter to accommodate the neck 20 and serrations 17 of the shank 12 but insufficient to permit flange 19 to pass therethrough. The hose 18 is provided with clamp 25 to effect a tight connection between the serrations 17 of shank 12 and the internal walls of hose 18.

In assembling the above-described female hose coupling element with the hose coupling wrench of the invention, clamp 25 is placed loosely over an end of hose 18 and the serrated, tubular shank 12 is passed through nut 11 and through circular aperture 24 in the base 22 of coupling wrench 21 and is inserted into hose 18, drawing nut 11 down between the parallel sides 23 of coupling wrench 21. In so doing, opposed planar surfaces 26 and 27 of nut 11 are positioned between sides 23 of the coupling wrench so that when coupling wrench 21 is rotated, nut 11 rotates with it. Shank 12 is inserted into the hose, confining the coupling wrench between flange 15 of nut 11 and the end of hose 18 and in engagement with nut 11. Clamp 25 is tightened around the end of hose 18 to maintain a tight seal between the interior walls of the hose and the serrations 17 of shank 12.

Figure 5:
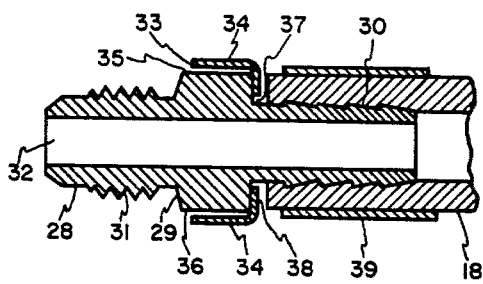
FIGURE 5 is a horizontal section of a male element of a hose coupling capable of mating with the female hose coupling element shown in FIGURE 3, including a coupling wrench in accordance with the present invention.

In FIGURE 5 of the drawing, fixed male hose coupling element 28 comprises a nut 29, a serrated shank 30 extending from one end of nut 29 and an externally threaded portion 31 of the male hose coupling element extending from the other end of nut 29. Nut 29 is preferably a hexagonal nut having three pairs of opposed substantially parallel, planar, exterior sides. A central bore 32 runs through shank 30, nut 29, and externally threaded portion 31 of the male hose coupling element.

Coupling wrench 33 is similar in structure to coupling wrench 21, but is of such dimensions that its upstanding parallel sides 34 fit closely against opposed parallel, planar surfaces 35 and 36 of nut 29 and shank 30 passes through circular aperture 37 centrally located in base 38 of the coupling wrench. When shank 30 is inserted in one end of hose 18 and clamp 39 is tightened to effect a tight joint between shank 30 and the interior walls of hose 18, the male hose coupling element 28 is ready for connection with the female hose coupling element 10 in the customary manner. However, in the present case no auxiliary tools are required for accomplishing the connection since coupling wrench 33 is held between the fingers and thumb of one hand, preventing rotation of male hose coupling elements 28 while nut 11 is being rotated with the threads thereof cooperating with the threads of threaded portion 31 by rotating coupling wrench 21 grasped between the thumb and fingers of the other hand. Disconnection of the coupling is accomplished simply by reversing the direction of rotation of coupling wrench 21 while holding coupling wrench 33 substantially stationary.

The height of the upstanding parallel sides 23 should not be greater than the height of the opposed parallel, planar surfaces 26 and 27 of nut 11 and similarly the height of the upstanding parallel sides 34 should not be greater than the height of the opposed parallel, planar surfaces 35 and 36 of nut 29 to avoid any interference with the mating portion of the coupling. On the other hand, sides 23 and 34 should be high enough and thick enough to permit the application of sufficient torque to the two nuts of the coupling elements by means of the wrenches to effect a tight joint without bending the sides of the wrenches out of their upstanding parallel positions.

While the coupling wrenches of the invention have been illustrated as having upstanding parallel sides extending the full length of the wrenches, it is to be understood that the length of these sides may be varied so long as they are capable of firmly engaging opposed surfaces of the hose coupling nut. Also, the length of the wrench member itself may be varied as conditions of use permit or require so long as the length is sufficient to enable the required torque to be applied to the nut.

It is also to be understood that the circular aperture in the base of a coupling wrench in accordance with this invention is not required to be centrally located in the base. For example, the circular aperture can be located near one end of the base of the coupling wrench.

It will be apparent that the hose coupling wrenches of this invention obviate the need for special wrenches separate and distinct from hose couplings for making or breaking connections in such hose couplings. This is especially advantageous for the Armed Forces since many military operations are dependent on making or breaking hose connections quickly and easily, sometimes under extremely cold conditions requiring mittens. When separate tools are required, there is a chance that such tools may be lost. Also they may require adjustment to fit a particular device. With this invention all such problems are eliminated since the hose coupling wrench is captive on the hose coupling element and it requires no adjustment to make it fit the nut on the coupling element.

It will be understood that various changes in the details, materials, steps and arrangements of parts, which have been herein described and illustrated in order to explain the nature of the invention, may be made by those skilled in the art within the principle and scope of the invention as expressed in the appended claims.

I claim:

1. A wrench for a threaded hose coupling member of the type having generally parallel opposed planar exterior surfaces for gripping said member during coupling and uncoupling thereof and a shank of reduced diameter extending from the portion thereof having said planar surfaces comprising an elongated body having at least two opposed substantially parallel upstanding flanges thereon spaced to engage a pair of said opposed planar surfaces on said coupling, a portion of said body lying between said flanges having an opening therethrough, said opening being sized to permit only the shank portion of said coupling member to pass therethrough, whereby the shank of said coupling member may be passed through said wrench to bring said flanges into engagement with said planar surfaces of said coupling member.

2. A wrench for a threaded hose coupling member of the type having generally parallel opposed planar exterior surfaces for gripping said member during coupling and uncoupling thereof and a shank of reduced diameter extending from the portion thereof having said planar surfaces comprising an elongated channel-shaped member capable of engaging a pair of said opposed planar surfaces between the sides thereof, the portion of said channel-shaped member lying between said sides having an aperture therethrough, said aperture being sufficiently large to permit said shank to pass therethrough and said wrench to be freely rotatable on said shank while preventing said nut from passing therethrough, whereby said wrench is retained on said coupling member when the shank of said coupling member is inserted in the end of the hose.

3. A wrench according to claim 1 wherein said opening is centrally located in said elongated body.

4. A wrench according to claim 2 wherein said sides of said elongated channel-shaped member are of a height not greater than the height of said opposed planar surfaces of said coupling member.

5. A wrench according to claim 1 wherein said flanges are substantially the full length of said wrench.

6. A wrench for a hose coupling of the type having a hexagonal portion and an elongated shank of reduced diameter extending therefrom comprising an elongated flat base and two parallel sides perpendicular to said base forming a channel therewith, said sides spaced to receive and engage opposed sides of said hexagonal portion, the height of said sides being not greater than the height of said hexagonal portion, and the length of said sides being substantially the length of said base, said base having a circular opening therethrough centrally located from side to side and end to end thereof, said opening being larger in diameter than said shank and smaller than the cross section of said hexagonal portion, whereby said shank passes through said opening into the end of a hose confining said wrench thereon with said hexagonal portion engageable in said channel.

7. In a threaded hose coupling member of the type having generally parallel opposed planar exterior surfaces for gripping said member during coupling and uncoupling thereof and a shank of reduced diameter extending from the portion thereof having said planar surfaces for fitting within and connecting said coupling member to a hose, that improvement therein which comprises a wrench having an elongated body having at least two opposed substantially parallel upstanding flanges thereon spaced to engage a pair of said opposed planar surfaces on said coupling, a portion of said body lying between said flanges having an opening therethrough, said opening being sized to permit only the shank portion of said coupling member to pass therethrough, whereby said wrench may be confined on said shank between the end of said hose and said portion of said coupling member having said planar surfaces.

8. In the combination of a hose and a threaded hose coupling member of the type having generally parallel opposed planar exterior surfaces for gripping said member during coupling and uncoupling thereof and a shank of reduced diameter extending from the portion thereof having said opposed planar surfaces, said shank being capable of fitting within and connecting said hose to said coupling member, the improvement comprising a wrench having an elongated body having at least two opposed substantially parallel upstanding flanges thereon spaced to engage a pair of said opposed planar surfaces on said coupling, the portion of said body lying between said flanges having an opening therethrough, said opening being larger than the external diameter of said shank and smaller than the external diameter of said hose and the cross section of the portion of the coupling member having said opposed planar surfaces, whereby said shank may be passed through said opening and into the end of said hose to thereby confine said wrench on said shank in a position to engage said opposed planar surfaces of said coupling member.

9. In the combination of a hose, a threaded hose coupling member of the type having generally parallel opposed planar exterior surfaces for gripping said member during coupling and uncoupling thereof and a shank of reduced diameter extending from the portion thereof having said planar surfaces, said shank being capable of fitting within and connecting said hose to said coupling member, and means for clamping said hose about said shank, the improvement comprising a wrench having an elongated body having at least two opposed substantially parallel upstanding flanges thereon spaced to engage a pair of said opposed planar surfaces on said coupling member, the portion of said body lying between said flanges having an opening therethrough, said opening being sized to permit the shank portion of said coupling member to pass therethrough but to prevent either the said portion of the coupling member having said opposed planar surfaces or the said means for clamping said hose about said shank from passing therethrough, whereby said shank may be passed through said opening and into the end of said hose and said clamping means applied to thereby confine said wrench on said shank in a position to engage said opposed planar surfaces of said coupling member.

References Cited by the Examiner
UNITED STATES PATENTS

| | | | |
|---|---|---|---|
| 1,803,472 | 5/1931 | Jahns | 285—39 |
| 1,855,586 | 4/1932 | Nordstrom | 81—119 |
| 2,071,478 | 2/1937 | Wick | 285—39 X |
| 2,733,937 | 2/1956 | Mowrer. | |

References Cited by the Applicant
UNITED STATES PATENTS

| | | |
|---|---|---|
| 2,067,773 | 1/1937 | Long. |
| 2,249,923 | 7/1941 | Whitcombe. |
| 2,333,243 | 11/1943 | Glab. |
| 2,512,469 | 6/1950 | Poss. |

WILLIAM FELDMAN, *Primary Examiner.*

MILTON S. MEHR, *Examiner.*